(12) United States Patent
Hyun

(10) Patent No.: US 7,217,230 B2
(45) Date of Patent: May 15, 2007

(54) APPARATUS FOR DETECTING POSITION OF DRAWBAR IN AUTOMATIC TOOL CHANGE DEVICE

(75) Inventor: Young-Jin Hyun, Ansan-Si (KR)

(73) Assignee: Yiwon Engineering Inc., Siheung-Si, Kyungki-Do (KR)

( * ) Notice: Subject to any disclaimer, the term of this patent is extended or adjusted under 35 U.S.C. 154(b) by 0 days.

(21) Appl. No.: 10/566,229

(22) PCT Filed: Feb. 13, 2004

(86) PCT No.: PCT/KR2004/000293

§ 371 (c)(1),
(2), (4) Date: Jan. 27, 2006

(87) PCT Pub. No.: WO2005/009677

PCT Pub. Date: Feb. 3, 2005

(65) Prior Publication Data

US 2006/0239788 A1    Oct. 26, 2006

(30) Foreign Application Priority Data

Jul. 28, 2003  (KR) .................... 10-2003-0051881

(51) Int. Cl.
*B23Q 3/157* (2006.01)
*B23C 5/26* (2006.01)
*B23B 47/18* (2006.01)

(52) U.S. Cl. ................... 483/31; 483/27; 483/36; 483/55; 408/240; 409/233; 82/112

(58) Field of Classification Search ............. 409/233, 409/232, 135, 136; 408/239 R, 240, 238; 82/1.11, 112; 483/1, 27, 31, 32, 36, 55, 56, 483/57; 267/130, 119, 64.11
See application file for complete search history.

(56) References Cited

U.S. PATENT DOCUMENTS

| | | | | |
|---|---|---|---|---|
| 2,811,877 A | * | 11/1957 | Degroff | .................... 408/130 |
| 3,139,637 A | * | 7/1964 | Minkenberg | ................. 408/132 |
| 3,191,260 A | * | 6/1965 | Jorgensen | .................... 483/56 |
| 3,797,956 A | * | 3/1974 | Bayer et al. | ................. 409/233 |
| 3,893,371 A | * | 7/1975 | Frazier | ........................ 409/233 |
| 3,999,769 A | * | 12/1976 | Bayer et al. | ................. 408/238 |
| 4,008,646 A | * | 2/1977 | Hague et al. | ............... 409/233 |
| 4,443,929 A | * | 4/1984 | Bayer et al. | .................. 483/32 |
| 5,039,261 A | | 8/1991 | Takada | |

(Continued)

FOREIGN PATENT DOCUMENTS

| JP | 60-131147 | 7/1985 |
|---|---|---|
| JP | 61-109647 | 5/1986 |

*Primary Examiner*—Dana Ross
(74) *Attorney, Agent, or Firm*—Ipla P.A.; James E. Bame

(57) ABSTRACT

Disclosed is an apparatus for detecting a position of a drawbar unit installed in a spindle unit. The apparatus is a part of an automatic tool exchange device for exchanging tools in the spindle unit of a machine tool. The apparatus transmits a signal to a main controller after detecting the position of the drawbar such that the main controller checks a state of a tool clamped by the drawbar unit. The drawbar unit is installed in the spindle unit forming the automatic tool exchange device and clamps the tool at a front thereof. A core is installed at a rear peripheral portion of the drawbar unit and a coil section having a cylindrical shape is wound around an outer peripheral portion of the core. An LC oscillating circuit is provided such that the LC oscillating circuit includes the coil section as a part thereof. An oscillating frequency of the LC oscillating circuit varies depending on a position of the core made of magnetic material, so the apparatus detects the position of the drawbar unit based on the oscillating frequency of the LC oscillating circuit. A position detecting section transmits present position information of the drawbar unit to a main controller, so the main controller detects the present position of the drawbar unit.

5 Claims, 4 Drawing Sheets

U.S. PATENT DOCUMENTS

| | | | |
|---|---|---|---|
| 5,242,360 A | * | 9/1993 | Bayer .......................... 483/36 |
| 5,613,929 A | | 3/1997 | Bayer |
| 5,619,133 A | * | 4/1997 | Shank et al. ........... 324/207.24 |
| 6,327,947 B1 | * | 12/2001 | Newell et al. ............... 82/1.11 |
| 6,330,847 B2 | * | 12/2001 | Newell et al. ................ 82/112 |
| 6,477,928 B2 | * | 11/2002 | Newell et al. ............... 82/1.11 |

* cited by examiner

APPARATUS FOR DETECTING POSITION OF DRAWBAR IN AUTOMATIC TOOL CHANGE DEVICE

TECHNICAL FIELD

The present invention relates to a spindle unit having an automatic tool exchange device, and more particularly to an apparatus for detecting a position of a drawbar installed in the spindle unit, in which the apparatus transmits a signal to a main controller after detecting the position of the drawbar in such a manner that the main controller can check a state of a tool clamped by the drawbar.

BACKGROUND ART

Generally, an automatic tool exchange device is used in a machining center or an automatic milling machine in order to automatically exchange a used tool with a new tool provided in a standby position. Such automatic tool exchange device includes a change arm having a gripper shape so as to rapidly and precisely perform the exchange work.

The machining center is a kind of a numerical control machine tool capable of automatically performing various kinds of machining works. The machining center has an automatic tool exchange function and is capable of automatically cutting, drilling or boring at least two planes of a workpiece. In order to achieve such various kinds of machining works in a short period of time, the machining center must automatically exchange tools. Hereinafter, clamping and unclamping operations of a conventional automatic tool exchange device provided in such machining center will be described with reference to FIG. 1.

In a case of a clamping operation, a tool 9 is introduced into a spindle shaft 6 along a tapered surface of the spindle shaft 6, so a collet 10 is inserted into the tool 9. Then, pressurized air is supplied into a pressurized air inlet hole 2 so that a piston 3 and a push rod 6 connected to the piston 3 moved up. As the push rod 5 moves up, a drawbar unit 7 installed in the spindle shaft 6 is also moved up due to elastic bias force of a disc spring 12 provided between the spindle shaft 6 and the drawbar unit 7.

Accordingly, an expansion part 8 formed at an end portion of the drawbar unit 7 is introduced into the collet 10, so that the collet 10 is expanded. Thus, the collet 10 securely grips the tool 9 and the spindle shaft 6, thereby clamping the tool 9.

In a case of an unclamping operation, pressurized air is supplied into a pressurized air inlet hole 1, so the piston 3 is moved down due to pressurized air. As the piston 3 moves down, the push rod 5 coupled to the piston 3 is also moves down along a guide surface of a housing 4.

When the push rod 5 moves down, an end portion of the push rod 5 downwardly pushes the drawbar unit 7 installed in the spindle unit 6, so the drawbar unit 7 is also moved down. As the drawbar unit 7 moves down, the collet 10, which has been expanded, recovers its initial shape and the end portion of the drawbar unit 7 pushes the tool 9, thereby unclamping the tool 9.

Recently, when an automatic tool exchange is installed on a main shaft of a machine tool including a high frequency spindle unit or a belt drive spindle unit, a drawbar unit is provided in a spindle shaft in order to strongly draw a tool or a tool holder including a taper shank, so that the tool or the tool holder is securely fixed to a nose of the spindle shaft. At this time, the drawbar moves in an axial direction of the spindle shaft within a range of 10 mm in order to draw and fix the tool. That is, the drawbar unit can be located in three different positions, such as a front position, a middle position and a rear position, within the range of 10 mm in the axial direction of the spindle shaft depending on a state of the tool.

In the front position, the tool is released from the drawbar unit. Since the tool is in a free state, the tool can be inserted into the spindle shaft or separated from the spindle shaft as required by a user. In the middle position, the drawbar unit securely draws the tool and fixes the tool to the spindle shaft. In the rear position, the tool is separated from the spindle shaft and the drawbar unit returns to its initial position without holding any tools.

Information about three different positions of the drawbar unit must be transmitted to a main controller in order to allow the main controller to prepare a next operation by checking the tool exchange state and in order to reliably and safely carry out machining work. A proximity switch is widely used as an inspection device for obtaining information about three different positions of the drawbar unit. Since only one position may be detected by using one proximity switch, three proximity switches are installed in the spindle unit in order to obtain information about three different positions of the drawbar unit.

However, a size of the proximity switch available from an open market is too large to install the proximity switch in an internal area of the spindle unit. In addition, it is difficult to install three proximity switches within a range of 10 mm corresponding to three different positions of the drawbar unit. Even if three proximity switches are installed in the spindle unit, it is required to adjust the positions of the three proximity switches by using a variable position fixing device so as to precisely install the three proximity switches. Moreover, since three cable lines are necessary for power supply and signal transmission in relation to three proximity switches, a cable line treatment work is additionally required.

DISCLOSURE OF THE INVENTION

Therefore, the present invention has been made in view of the above-mentioned problems, and it is an object of the present invention to provide an apparatus for detecting a position of a drawbar unit, which is installed in a spindle unit so as to transmit position information of the drawbar unit to a main controller by detecting the position of the drawbar unit.

In order to accomplish the above object, there is provided an apparatus for detecting a position of a drawbar unit of an automatic tool exchange device including the drawbar unit and a spindle unit receiving the drawbar unit for allowing the drawbar unit to easily clamp the tool, the position detecting apparatus for the drawbar unit comprising: a core installed at a rear peripheral portion of the drawbar unit; a coil section wound around an outer peripheral portion of the core and having a hollow cylindrical shape with a predetermined thickness and a predetermined length; an LC oscillator connected to the coil section for generating a frequency signal, which varies depending on an inductance value of the coil section; and a position detecting section connected to the LC oscillator so as to transmit position information of the drawbar unit to a main controller by detecting the position of the drawbar unit based on the frequency signal generated from the LC oscillator.

According to the preferred embodiment of the present invention, the position detecting section includes a counter, which repeatedly counts the frequency signal generated from the LC oscillator for every one cycle in every predetermined period of time, a memory section for storing first count values of frequency signals per predetermined unit time corresponding to three different positions of the drawbar unit, and a microcomputer comparing the first count values stored in the memory section with a second count value of an oscillating signal per predetermined unit time, which is currently transmitted from the counter, thereby detecting a present position of the drawbar unit.

According to the preferred embodiment of the present invention, the drawbar unit installed in the spindle unit forming the automatic tool exchange device clamps the tool at a front thereof. An extension rod is formed at the rear portion of the drawbar unit. The extension rod is provided to stably mount the magnetic core around an outer peripheral portion thereof. If a size of an outer diameter of the drawbar unit is suitable for mounting the magnetic core, it is not required to provide the extension rod.

The magnetic core is installed around the outer peripheral portion of the extension rod and the cylindrical coil section is positioned around an outer peripheral portion of the core. The coil section is connected to the LC oscillator as a part of the LC oscillator. A variable frequency signal generated from the LC oscillator is transmitted to the position detecting section so that the position detecting section detects a present position of the drawbar unit. The position detecting section transmits position information of the drawbar unit to a main controller, so the main controller may precisely control an operation of the automatic tool exchange device.

BRIEF DESCRIPTION OF THE DRAWINGS

The foregoing and other objects, features and advantages of the present invention will become more apparent from the following detailed description when taken in conjunction with the accompanying drawings in which.

BEST MODE FOR CARRYING OUT THE INVENTION

Reference will now be made in detail to the preferred embodiments of the present invention.

In the following description of the present invention, a detailed description of known functions and configurations incorporated herein will be omitted when it may make the subject matter of the present invention rather unclear.

Hereinafter, a preferred embodiment of the present invention will be described with reference to accompanying drawings.

Figure 1:
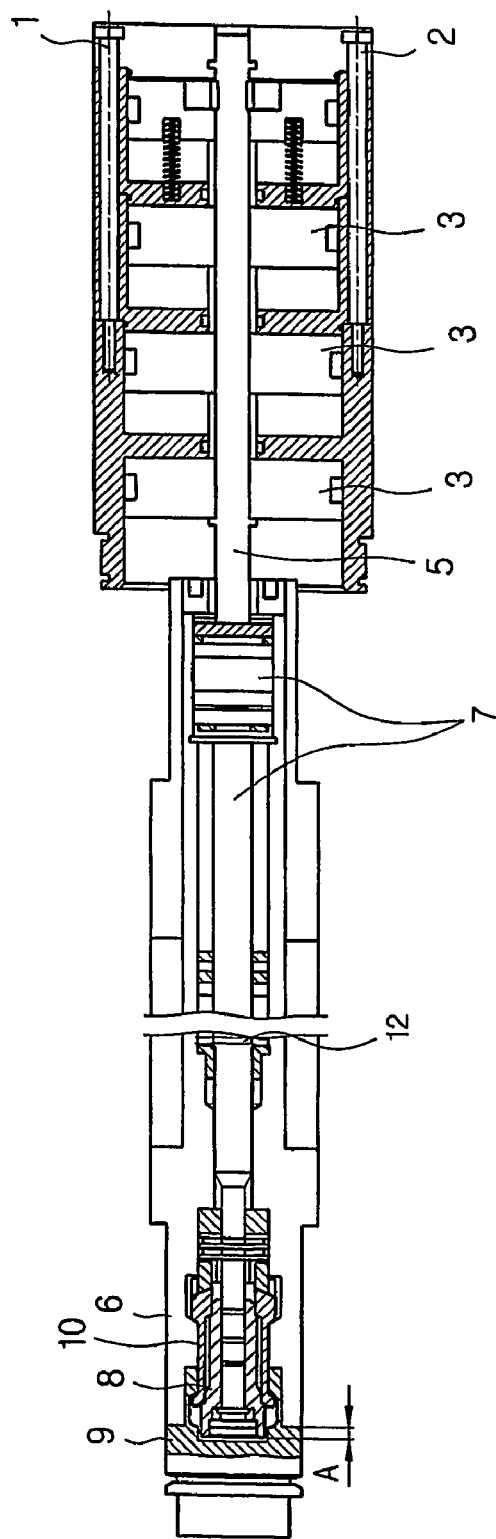
FIG. 1 is a schematic view showing a structure of a conventional automatic tool exchange device.
Figure 2:
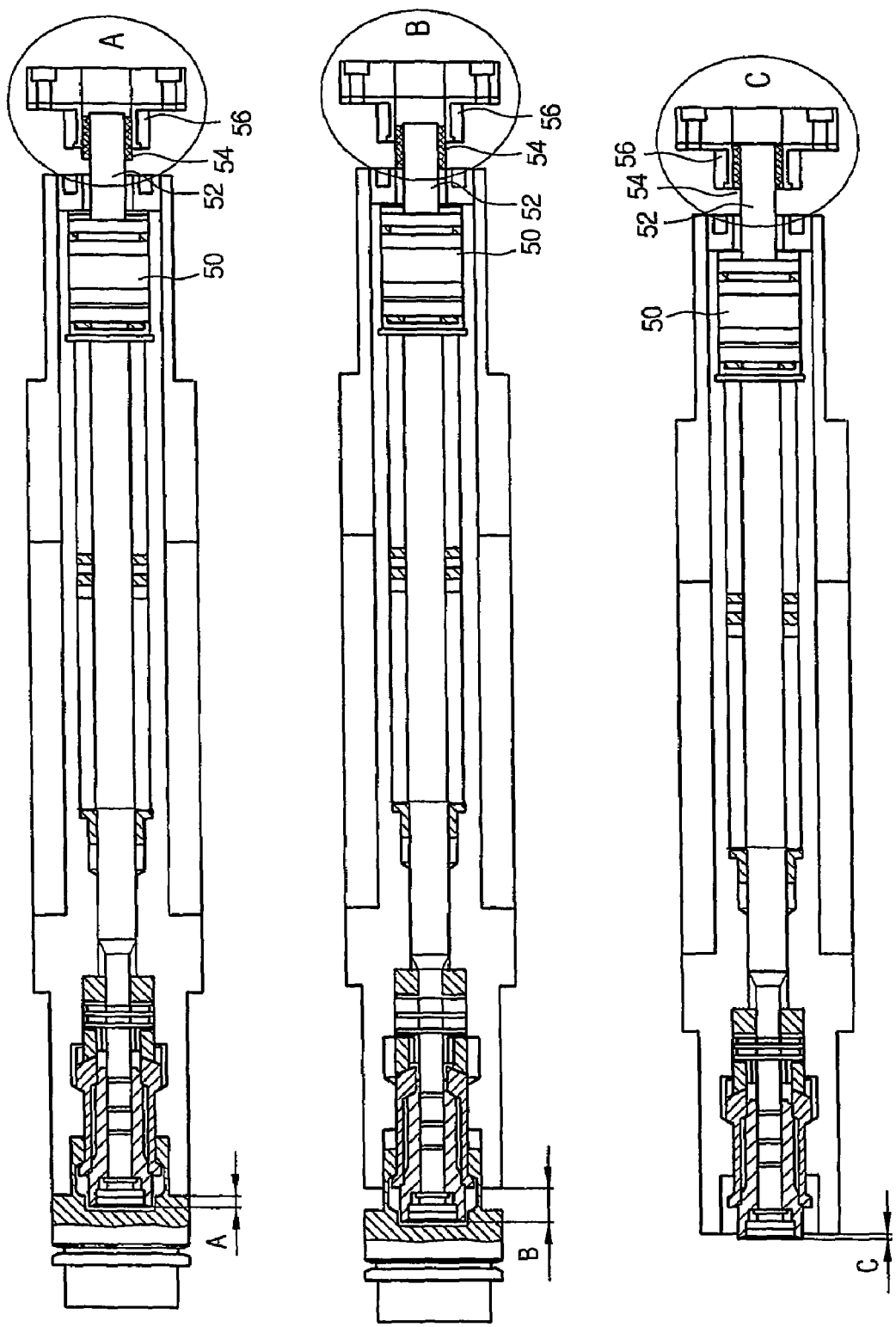
FIG. 2 is a view showing a structure of a drawbar unit of an automatic tool exchange device according to a first embodiment of the present invention, in which "A" represents a drawbar unit clamping a tool, "B" represents a drawbar unit with a tool unclamped from the drawbar unit, and "C" represents a drawbar unit clamped without holding a tool.

FIG. 1 is a schematic view showing a structure of a conventional automatic tool exchange device and FIG. 2 is a view showing a structure of a drawbar unit of an automatic tool exchange device according to a first embodiment of the present invention, in which "A" represents a drawbar unit clamping a tool, "B" represents a drawbar unit with a tool unclamped from the drawbar unit, and "C" represents a drawbar unit clamped without holding a tool. In addition, FIG. 3 is a schematic view showing a position detecting device installed at a rear portion of a drawbar unit.

Figure 3:
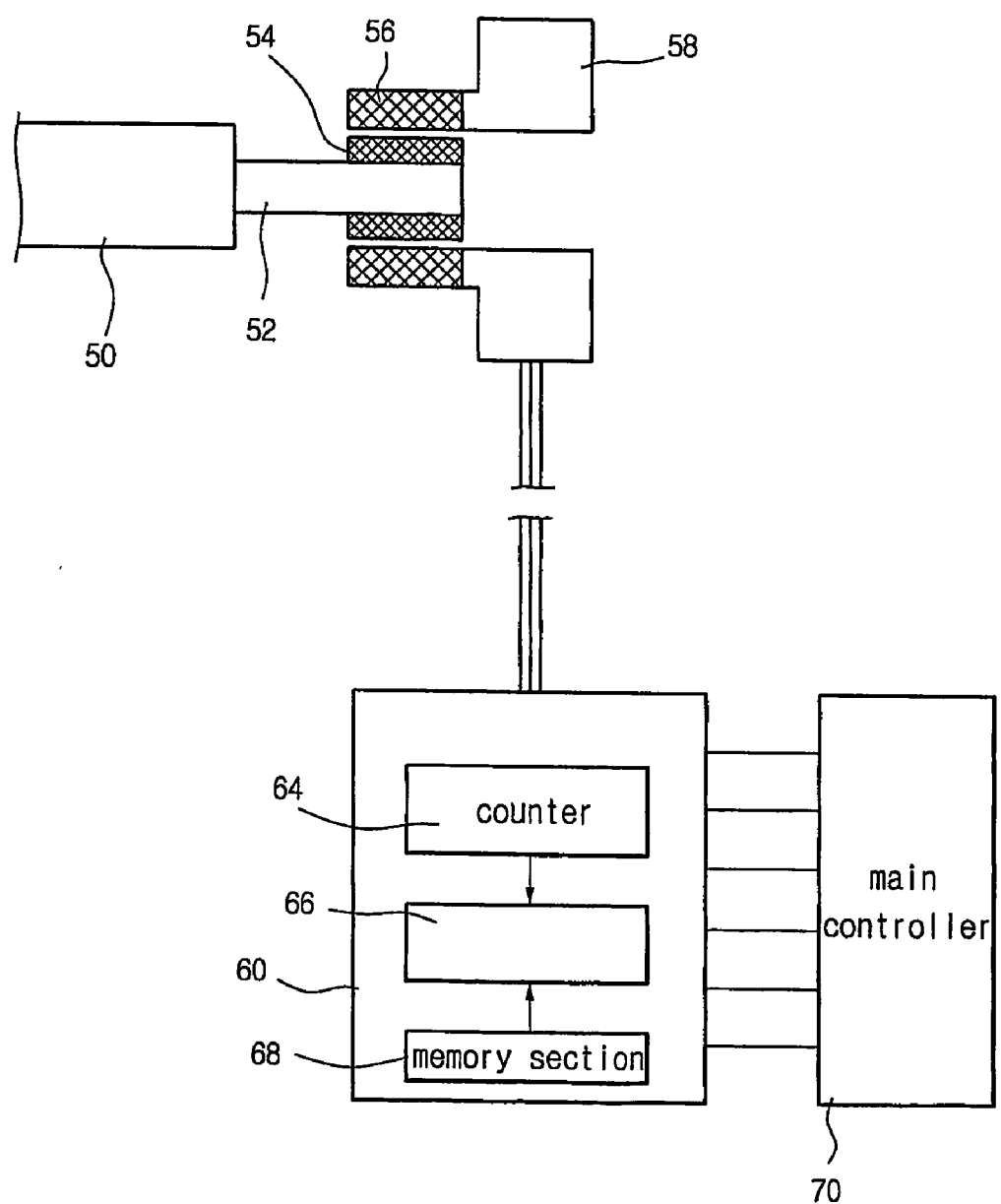
FIG. 3 is a schematic view showing a position detecting device installed at a rear portion of a drawbar unit according to a first embodiment of the present invention.

Referring to FIGS. 2 and 3, a tool is clamped in front of a drawbar unit 50, which is a part of an automatic tool exchange device. An extension rod 52 is formed at a rear portion of the drawbar unit 50 and extends therefrom. A core 54 made of a magnetic member having high magnetic permeability is aligned at an outer peripheral surface of the extension rod 52. Thus, the extension rod 52 and the core 54 are integrally formed with the drawbar unit 50, so they are integrally moved up and down.

A coil section 56 is aligned around the core 54. The coil section 56 has a hollow cylindrical shape and an inductance value of the coil section 56 varies depending on a position of the core 54. An LC oscillator 58 is connected to the coil section 56 so as to generate a frequency signal, which varies depending on the inductance value of the coil section 56. The LC oscillator 58 is coupled with a position detecting section 60.

The position detecting section 60 is provided with a counter 64, which counts the frequency signals generated from the LC oscillator 58. The position detecting section 60 includes a memory section 68 for storing count values of frequency signals generated from the LC oscillator 58 when the drawbar unit 50 is positioned in three different positions, that is, a clamping position, an unclamping position and a tool releasing position of the drawbar unit 50.

Both memory section 68 and counter 64 are connected to a microcomputer 66. The microcomputer 66 compares the count value stored in the memory section 68 with a present frequency count value of the counter 64, thereby detecting a present position of the drawbar unit 50. A main controller 70 is connected to the microcomputer 66, so the microcomputer 66 transmits position information of the drawbar unit 50 to the main controller 70. Upon receiving position information of the drawbar unit 50, the main controller 70 controls an operation of an automatic tool exchange device according to a position of the drawbar unit 50.

Hereinafter, a position detecting operation for the drawbar unit 50 according to a preferred embodiment of the present invention will be described.

Firstly, when the drawbar unit 50 clamps the tool, the drawbar unit 50 moves up, so the core 54 is further introduced into the coil section 56, so that the core 54 is almost accommodated in the coil section 56 as shown in "A" of FIG. 2. On the contrary, when the drawbar unit 50 unclamps the tool, the drawbar unit 50 moves down, so the core 54 is slightly retreated from the coil section 56 as shown in "B" of FIG. 2. In addition, if the drawbar unit 50 is clamped when the tool is completely released from the drawbar unit 50, the drawbar unit 50 maximally moves up so that the core 54 is completely accommodated in the coil section 56.

Accordingly, as mentioned above, a position of the core 54 with respect to the coil section 56 may vary according to the three positions of the clamp units 50, that is, when the tool is clamped by the drawbar unit 50, when the tool is unclamped from the drawbar unit 50, and when the tool is completely released from the drawbar unit 50a.

A value of an oscillating frequency generated from the LC oscillator 58 connected to the coil section 56 may vary according to the position of the core with respect to the coil section 56. The oscillating frequency signal generated from the LC oscillator 58 is applied to the counter 64 of the position detecting section 60.

Accordingly, the counter 64 counts the frequency signals and transmits the count value to the microcomputer 66. The microcomputer 66 compares the count value transmitted from the counter 64 with the count value stored in the memory section 68, thereby determining whether the tool is clamped/unclamped by/from the drawbar unit 50 or the tool is completely released from the drawbar unit 50. In addition, the microcomputer 66 transmits a corresponding signal to the main controller 70 based on the above determination.

The main controller 70 controls the operation of the automatic tool exchange device according to the signal transmitted from the microcomputer 66 of the position detecting section 60.

Figure 4:
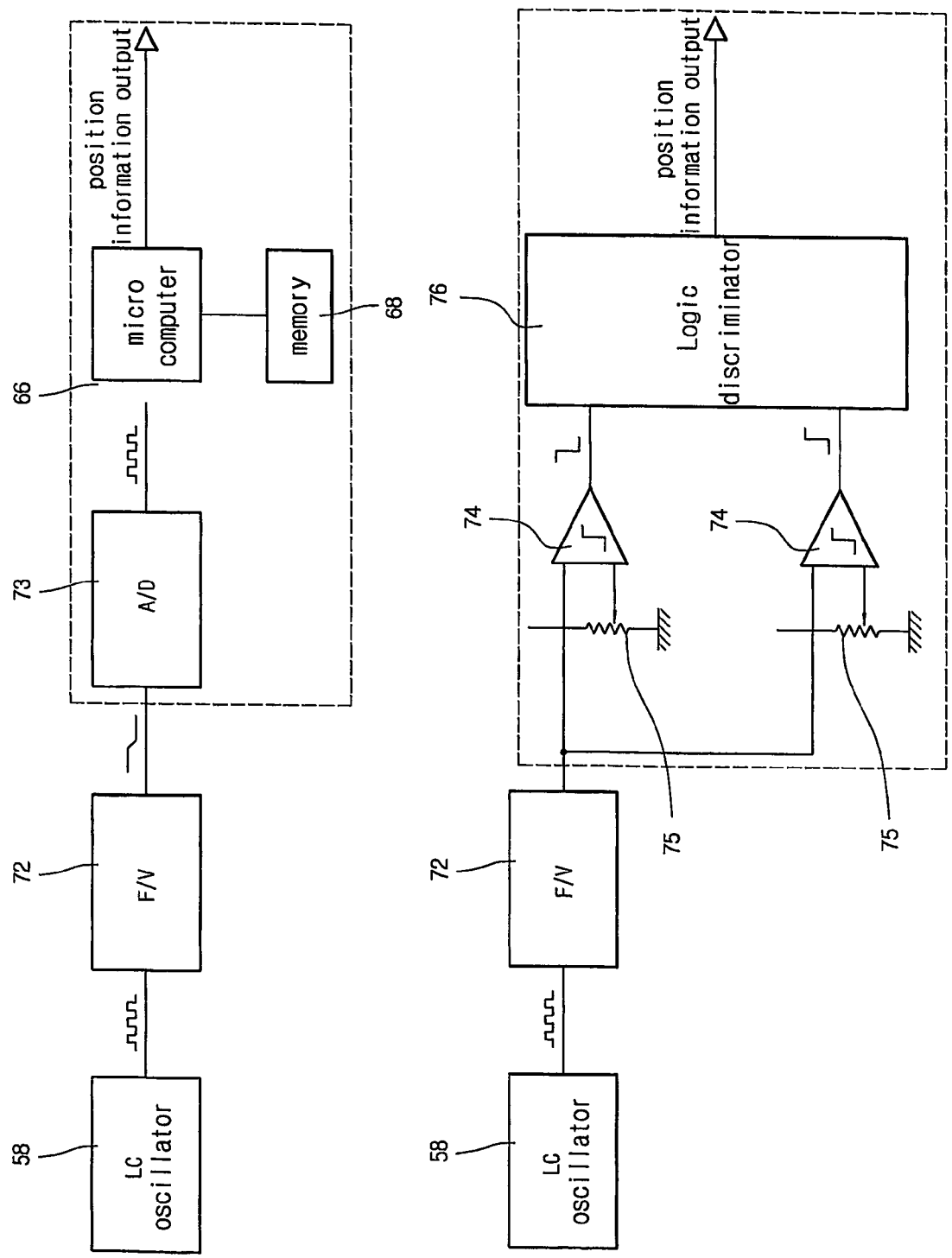
FIG. 4 is a view showing position detecting devices installed at a rear portion of a drawbar unit according to second and third embodiments of the present invention.

According to second and third embodiments of the present invention as shown in FIG. 4, the position detecting section 60 of the present invention includes an F/V converter 72 for converting a frequency signal into a voltage signal in addition to the above mentioned microcomputer 66, memory section 68 and counter 64. In this case, the oscillating signal generated from the LC oscillator 58 is converted into a voltage signal by means of the F/V converter 72 and the position of the drawbar unit 50 is detected based on the voltage signal.

For example, the microcomputer 66 reads in the voltage signal through an A/D converter 73, thereby detecting the position of the drawbar unit 50. Otherwise, a voltage comparator 74 compares the voltage signals with each other, thereby detecting the position of the drawbar unit 50.

In a case in which the A/D converter 73 is used, a frequency signal generated when the drawbar unit 50 is in a predetermined position is converted into a voltage signal by means of the F/V converter 72 and the microcomputer 66 stores the voltage signal in the memory section 68 through the A/D converter 73. When the drawbar unit 50 operates, the microcomputer 66 compares the voltage value stored in the memory section 68 with a voltage value corresponding to a present position of the drawbar unit 50, thereby detecting the position of the drawbar unit 50.

In order to realize the second embodiment of the present invention, in which the microcomputer 66 reads in the voltage signal through the A/D converter 73 to detect the position of the drawbar unit 50, the position detecting section may include the F/V converter 72 for converting the frequency signal into the voltage signal, the A/D converter 73 for converting an analog value of the voltage signal into a digital value, the memory section 68 for storing voltage values corresponding to three positions of the drawbar unit 50, and the microcomputer 66 for detecting the present position of the drawbar unit 50 by comparing the voltage value stored in the memory section 68 with the voltage value applied thereto through the F/V converter 72.

In a case in which the voltage comparator 74 is used, predetermined voltage signals are set by dividing the predetermined voltage signals using a variable resistor 75 in order to compare the predetermined voltage signals with a voltage signal generated when the drawbar unit 50 is in a predetermined position. Then, when the drawbar unit 50 operates, the predetermined voltage signals are compared with a voltage value generated corresponding to a present position of the drawbar unit 50, thereby detecting the position of the drawbar unit 50. According to this embodiment, costs required for providing software to manage the microcomputer or the memory section can be reduced.

In order to realize the third embodiment of the present invention, in which voltage signals are compared with each other by means of the voltage comparator 74 to detect the position of the drawbar unit 50, the position detecting section may include the F/V converter 72 for converting the frequency signal into the voltage signal, at least two variable resistors 75 for setting several voltage signals in order to compare the voltage signals with a voltage value generated when the drawbar unit 50 is in a predetermined position, the voltage comparator 74 for comparing the voltage values of the variable resistors 75 with the present voltage value applied from the F/V converter 72, and a discriminator 76 for detecting the position of the drawbar unit 50 based on a result of the above comparison.

INDUSTRIAL APPLICABILITY

As can be seen from the foregoing, according to the present invention, the hollow coil section is provided at the rear portion of the drawbar unit, and the extension rod integrally formed with the drawbar unit is accommodated in the hollow coil section in such a manner that the extension rod moves up and down together with the drawbar unit. In addition, the magnetic core is attached to an outer portion of the extension rod, so that the magnetic core is also moved up and down together with the drawbar unit. Accordingly, the inductance value of the coil section varies depending on the magnetic core, so the oscillating frequency generated from the LC oscillator is also varied. The present invention obtains position information of the drawbar unit by using the variation of the oscillating frequency of the LC oscillator.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

The invention claimed is:

1. An apparatus for detecting a position of a drawbar unit of an automatic tool exchange device for clamping a tool, the tool exchange device including the drawbar unit and a spindle unit receiving the drawbar unit for allowing the drawbar unit to easily clamp the tool, the position detecting apparatus for the drawbar unit comprising:
   a core installed at a rear peripheral portion of the drawbar unit;
   a coil section wound around an outer peripheral portion of the core and having a hollow cylindrical shape with a predetermined thickness and a predetermined length;
   an LC oscillator connected to the coil section for generating a frequency signal, which varies depending on an inductance value of the coil section; and
   a position detecting section connected to the LC oscillator so as to transmit position information of the drawbar unit to a main controller by detecting the position of the drawbar unit based on the frequency signal generated from the LC oscillator.

2. The position detecting apparatus as claimed in claim 1, wherein an extension rod is integrally formed with a rear portion of the drawbar unit, and the core made of magnetic material is installed around an outer peripheral portion of the extension rod.

3. The position detecting apparatus as claimed in claim 1, wherein the position detecting section includes a counter, which repeatedly counts the frequency signal generated from the LC oscillator for every one cycle in every predetermined period of time, a memory section for storing first count values of frequency signals per predetermined unit time corresponding to three different positions of the drawbar unit, and a microcomputer comparing the first count values stored in the memory section with a second count value of an oscillating signal per predetermined unit time, which is currently transmitted from the counter, thereby detecting a present position of the drawbar unit.

4. The position detecting apparatus as claimed in claim 1, wherein the position detecting section includes an F/V converter for converting a frequency signal into a voltage signal, an A/D converter for converting an analog value of the voltage signal into a digital value, a memory section for storing first voltage values corresponding to three positions of the drawbar unit, and a microcomputer for detecting a present position of the drawbar unit by comparing the first voltage values stored in the memory section with a second voltage value applied thereto through the F/V converter.

5. The position detecting apparatus as claimed in claim 1, wherein the position detecting section includes an F/V converter for converting a frequency signal into a voltage signal, at least two variable resistors for setting several voltage signals in order to compare the voltage signals with a voltage value generated when the drawbar unit is in a predetermined position, a voltage comparator for comparing the voltage values of the variable resistors with a present voltage value applied from the F/V converter, and a discriminator for detecting the position of the drawbar unit based on a result of the comparison.

* * * * *